United States Patent [19]
Dickinson

[11] 3,937,289
[45] Feb. 10, 1976

[54] SNOW CAT

[76] Inventor: Lawrence Chapman Dickinson, 2255 Eva Adams, Reno, Nev. 89504

[22] Filed: Jan. 16, 1974

[21] Appl. No.: 433,940

[52] U.S. Cl............................ 180/9.44; 305/35 EB
[51] Int. Cl.² ....................................... B62D 11/00
[58] Field of Search........... 180/9, 9.2 R, 9.44, 9.46, 180/9.62; 305/35 EB, 54

[56] References Cited
UNITED STATES PATENTS

| | | | |
|---|---|---|---|
| 3,035,654 | 5/1962 | Nuttall | 180/9.44 |
| 3,443,654 | 5/1969 | Schoonover | 180/9.44 |
| 3,473,619 | 10/1969 | Dion | 180/9.44 |
| 3,688,858 | 9/1972 | Jespersen | 180/9.62 |
| 3,715,146 | 2/1973 | Robertson | 305/54 |
| 3,789,942 | 2/1974 | Kowalik | 180/9.44 |

Primary Examiner—Philip Goodman
Assistant Examiner—John A. Carroll
Attorney, Agent, or Firm—Townsend and Townsend

[57] ABSTRACT

A vehicle adapted to traverse snow-covered areas, commonly called a "snow cat," is disclosed. The snow cat of the present invention includes fore and aft substantially rigid body frame members. An articulating joint joins the fore and aft body frame members and permits relative rolling motion and yawing motion respectively between the two rigid members. Yawing motion at the joint is controlled manually to steer the vehicle. Two track assemblies are mounted on each side of both the fore and aft body frame members. Each track assembly includes a relatively wide endless track having a moving flat base portion which rides over snow. A track assembly having a plurality of rows of rollers is disclosed for maintaining the base portion in its substantially flat configuration. The drive sprocket for each track assembly is located slightly above and intermediate the rollers so that the track is maintained in a triangular configuration. Fore and aft torsion bars provide stabilizatiton between the two forward track assemblies and the two aft track assemblies respectively.

8 Claims, 7 Drawing Figures

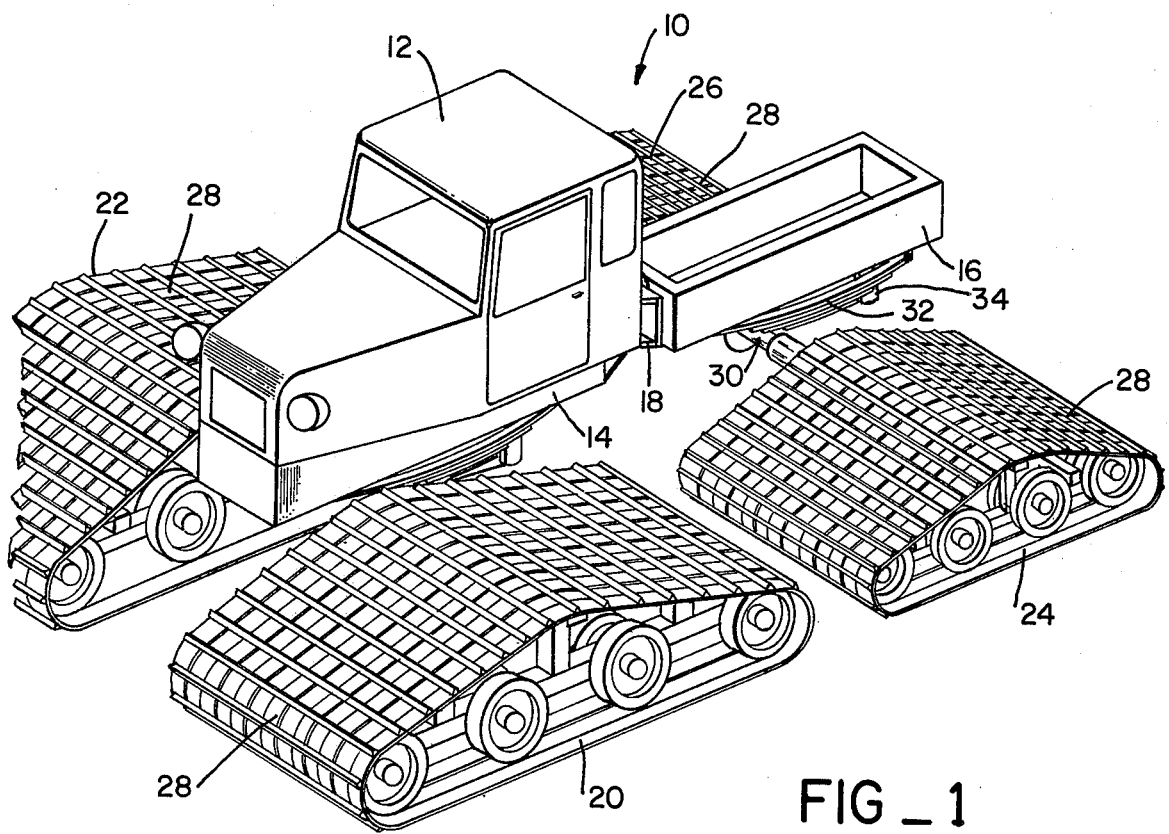
FIG _ 1
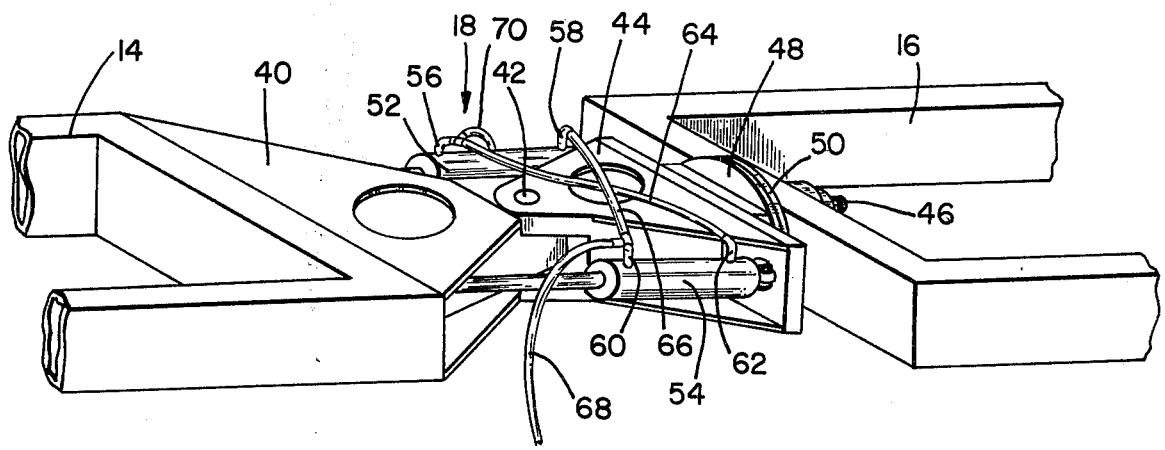
FIG _ 2

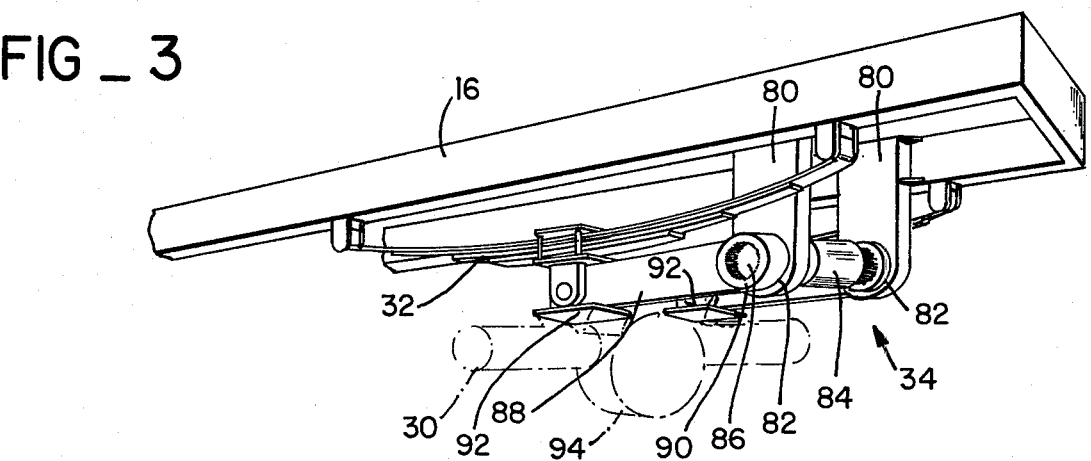
FIG_3
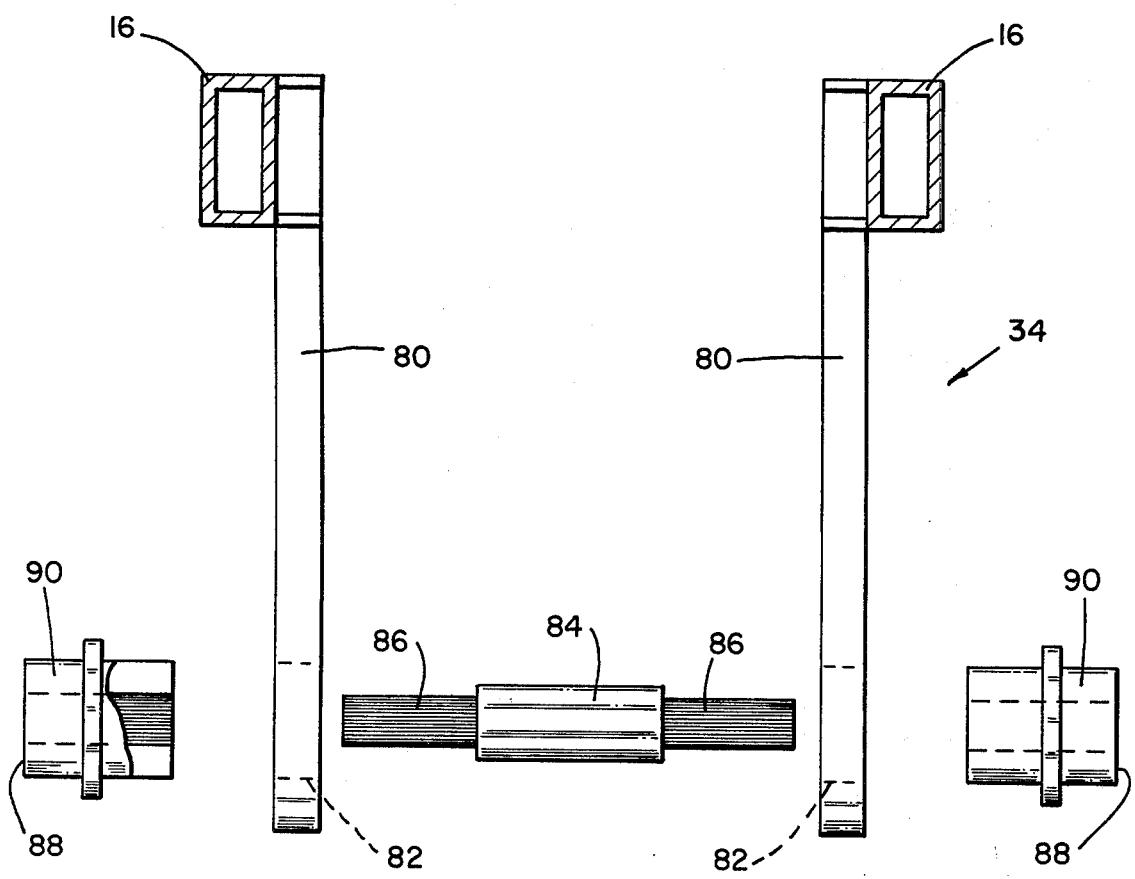
FIG_4

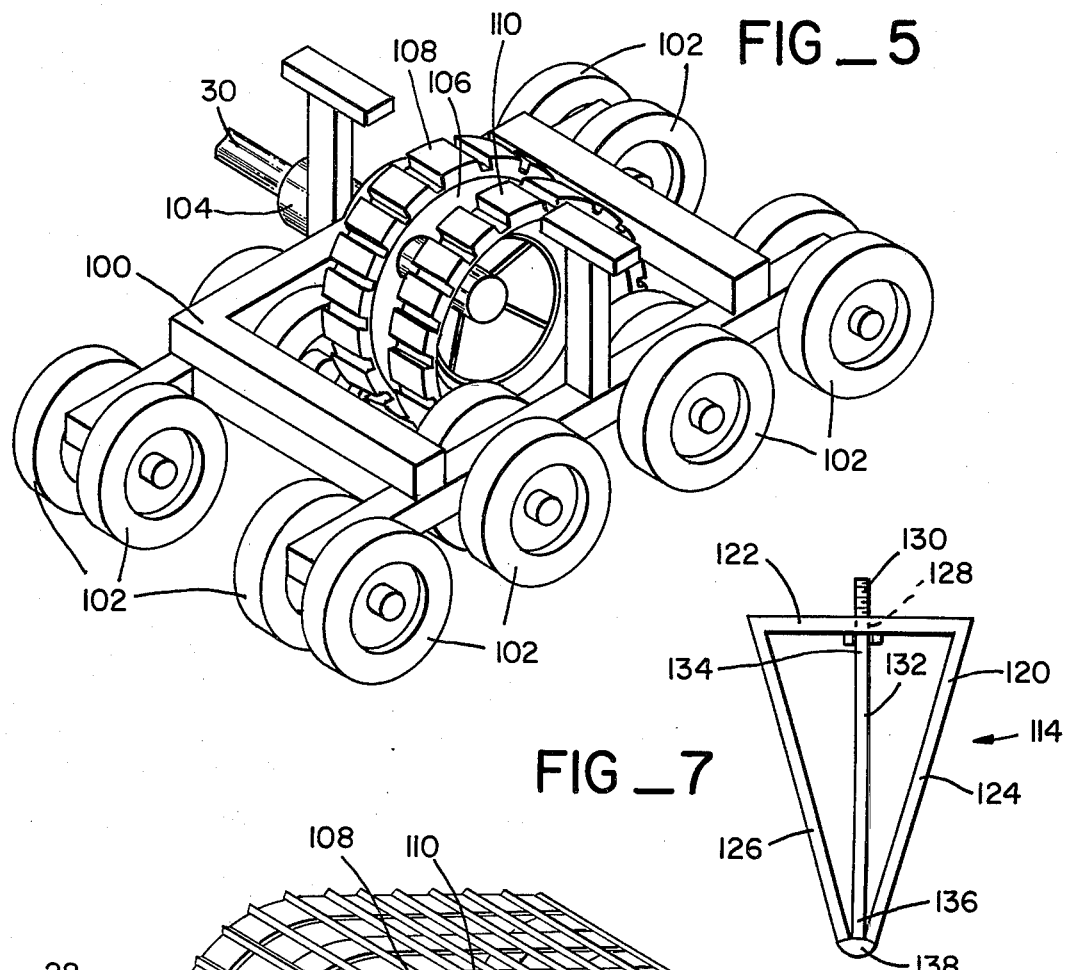
FIG_5
FIG_7
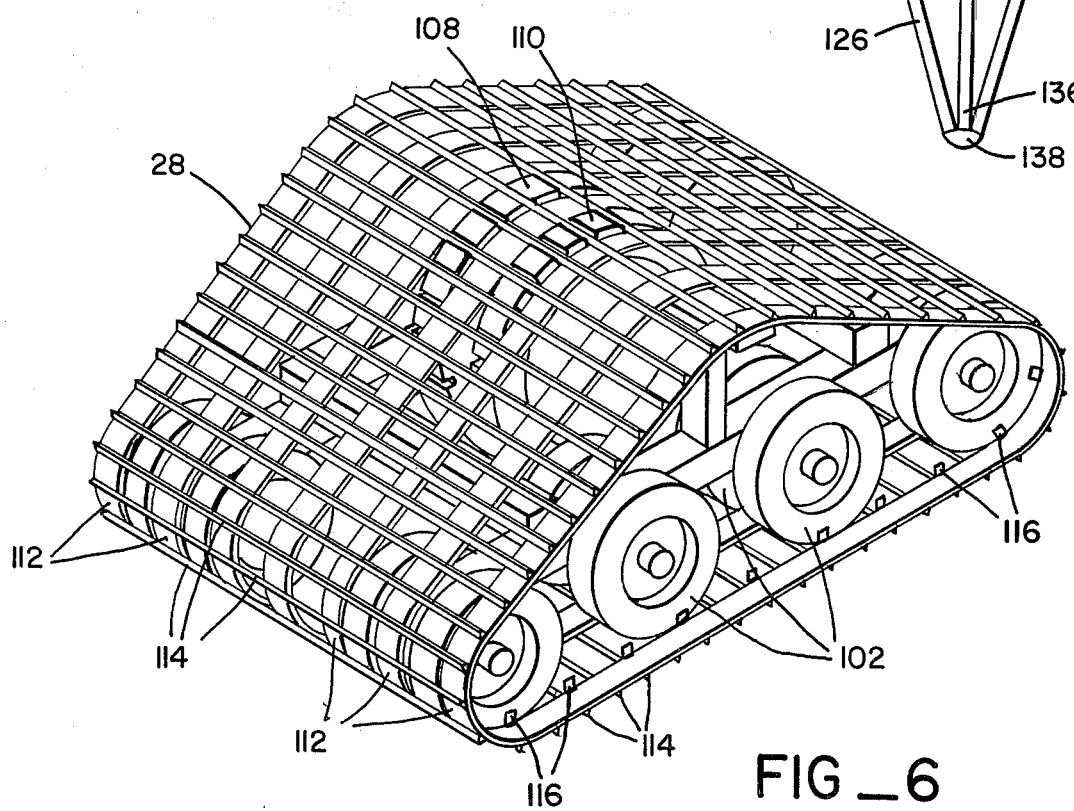
FIG_6

SNOW CAT

BACKGROUND OF THE INVENTION

The present invention relates to vehicles adapted to ride over snow and commonly called "snow cats." Such vehicles are often used to groom ski slopes and also can be used as construction or transportation vehicles in snow-covered areas.

Snow cats found in the art generally employ a substantially rigid frame having track assemblies mounted at each corner or single track assemblies on each side. The rigid frame prevents the snow cat from conforming to mounds and other irregular features in the terrain. When a track assembly encounters an obstruction, the entire vehicle must traverse it. As a result, often only a small portion of the track assemblies of the vehicle may be in contact with the snow in a rugged area and some of the tracks may be lifted out of the snow decreasing the vehicle's purchase of the snow.

In order to turn snow cats found in the art, the speed of the tracks on one side of the frame is reduced or stopped without changing the speed on the other side. Since the track assemblies found on these snow cats are relatively narrow, this in an effective albeit inefficient method for turning the vehicle. Even with narrow track assemblies turning in this manner digs up a large volume of loose snow. This is undesirable on a ski slope, and such turning must either be done gradually or off to the side of the slope. With relatively wide tracks the vehicle cannot rotate efficiently since the elongate grousers on such a track will dig into the snow and prevent such turning.

The width of the tracks found on available snow cats is relatively narrow for a variety of reasons. The primary reason is that such track assemblies ride on a single row of wheels or casters which only provide a limited lateral stability to the track, thus limiting the width of that track. Another reason is that the load of the vehicle is carried at the center of the track, and if the grouser portion of the track spans a crevice or gap in the snow, the stress on the grousers will cause them to bend. Most available snow cats use grousers which have a relatively large cross section in order to achieve the desired bending strength. However, such a large cross section is undesirable when the snow cat is used to groom ski slopes because the grousers will then throw up large chunks of snow rather than create a smooth cured slope. Also a large narrow grouser does not dig into packed snow or ice as efficiently as a small wide grouser.

Many snow cats utilize a track assembly which has a plurality of tandem rollers wherein the lower surface of the roller rides on the track and the upper surface of the roller provides the return path for the track. One disadvantage of such a construction is that one of the rollers must be used as the drive roller, and the differential and drive axle must be relatively low to correspond with the center of the drive roller. Hence, the drive axle and differential often come into contact with the snow. When the rollers are made larger to raise the position of the drive axle and differential farther off the ground, the portion of track which circumscribes the fore and aft rollers is relatively large, and minimizes the proportion of track which is in contact with the snow. Hence, a relatively large amount of track must be used in order to have a sufficient length of track in contact with the snow.

SUMMARY OF THE INVENTION

The present invention provides a snow cat having independent fore and aft substantially rigid body frame members. An articulating joint joins the fore and aft body frame members, and permits relative rolling motion and relative yawing motion therebetween. Two endless track assemblies are mounted on each side of the fore body frame member and two on each side of the aft body frame member. Each track assembly has a relatively wide endless track which has a moving flat base portion which rides over snow and means for maintaining the base portion in its substantially flat configuration. Forward and aft stabilizer means are provided which interconnect the track assemblies mounted on the fore body frame member and the aft body frame member respectively to limit relative vertical motion between adjacent pairs of track assemblies.

The articulating joint allows the relatively wide track assemblies to substantially conform to the terrain. Thus, the flat lower portion of each of the four track assemblies is ordinarily maintained in full contact with the snow to provide maximum purchase thereon. This is particularly important in grooming ski slopes which are often covered with moguls or small mounds and which are usually guite steep. Furthermore, the snow cat is able to travel along gullies and other rough features of the terrain without substantially decreasing its purchase in the snow.

In the preferred embodiment of the present invention, manually operable means are provided for controlling the relative yawing motion between the fore and aft body frame members at the articulating joint in order to steer the vehicle. This eliminates the necessity for slowing or stopping the tracks on one side of the vehicle for turning it. Thus, the track is not rotated sideways on the snow as the snow cat is being turned and churns up loose snow. Furthermore, the limitation on the width of the tracks which could be employed in former snow cats due to the necessity that the tracks rotate on the snow as the snow cat is turned is eliminated. Also a snow cat having a relatively wide track employing long grousers is provided by the present invention, making such turning difficult or impossible.

When the articulating joint is used to turn a vehicle such as the snow cat of the present invention, it has been found that the vehicle can contort itself into the shape of a bow. Specifically, when a left turn is being made, the left front and right rear track assemblies will raise relative to the right front and left rear assemblies. Such distortion of the vehicle is undesirable and limits the freedom of the vehicle to conform to terrain irregularities. The present invention provides a torsion bar assembly at both the fore and aft track assemblies. One torsion bar interconnects the fore track assemblies to severely limit the relative vertical motion between the two fore track assemblies, and the other torsion bar prevents relative vertical motion between the aft track assemblies. Thus, bowing of the vehicle in a turn is substantially eliminated.

One of the objects of the present invention is to provide a relatively wide but stable endless track. As stated above, the width of the tracks which could be used in former snow cats was limited. However, the present invention provides for the use of a plurality of parallel rows of tandem rollers which at least partially span the width of the track. Thus, the weight of the vehicle is distributed along the length of the grousers, substantially reducing the bending strength required thereof. Also, the possibility of the vehicle rolling over is minimized because the vehicle must pivot about the outermost row of wheels of the track. The wide track allows for the use of a relatively thin but highly elongate grouser without sacrificing stability of the track. A grouser having a high strength to weight ratio is disclosed herein to further minimize the cross-section of the grouser. Such a grouser substantially increases the purchase of the track on packed snow and ice, and also minimizes the chunks of snow which are thrown up by the track, an important consideration when grooming a ski slope.

The present invention provides a sprocket which is raised relative to the rollers and is located intermediate the rollers so that the track is maintained in a generally triangular configuration. In this manner, the drive axle and differential can be kept well out of the snow without making the rollers larger. Minimizing the size of the roller maximizes the portion of the track which is actually in contact with the snow to further maximize traction of the vehicle for a given length of track.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a snow cat constructed according to the principles of the present invention;

FIG. 2 is a fragmentary perspective view of the articulating joint used in the snow cat illustrated in FIG. 1;

FIG. 3 is a fragmentary perspective view of the stabilizer assembly of the present invention;

FIG. 4 is a rear elevation expanded view of the stabilizer assembly illustrated in FIG. 3;

FIG. 5 is a perspective view of the track assembly of the present invention with the endless track removed;

FIG. 6 is a perspective view of the track assembly of the present invention with the endless track in place;

FIG. 7 is a side elevation view of the preferred grouser assembly of the present invention.

DESCRIPTION OF THE PREFERRED EMBODIMENT

The snow cat 10 of the present invention is illustrated generally by way of reference to FIG. 1. Snow cat 10 has a cab 12 which is mounted on a rectangular body frame member 14 at the forward portion of the vehicle. An aft rectangular body frame member 16 is attached to fore body member 14 by means of an articulating joint 18 which will be illustrated in more detail hereinafter. Endless track assemblies 20 and 22 are mounted to fore body member 14 on each side. Similarly, track assemblies 24 and 26 are mounted on each side of the aft body frame member 16. The endless track portion 28 of track assemblies 20–26 are relatively wide as will be further illustrated hereinafter.

Rear track assemblies 24, 26 are interconnected and mounted to the aft body frame member 16 by means of axle 30. Forward track assemblies 20, 22 are similarly interconnected by an axle (not visible) and mounted to fore body frame member 14 therewith. Each axle such as 30 is suspended from its associated frame member by means of leaf springs such as 32. Relative vertical motion between track assemblies such as 24 and 26 is controlled by means of a stabilizer assembly 34 which will be further illustrated below. A similar stabilizer assembly (not visible) controls relative motion between track assemblies 20 and 22.

Articulating joint 18 is further illustrated by way of reference to the fragmentary view of FIG. 2. Articulating joint 18 has a forward triangular portion 40 rigidly attached to fore body frame member 14. Triangular portion 40 is connected by means of a pin joint 42 to a rear complementary triangular portion 44. Triangular portion 44 is rotatably connected to aft body frame members 16 by means of a shaft 46. A first circular plate 48 is rigidly attached to triangular portion 44 of articulating joint 18, and a second complementary circular plate 50 is rigidly attached to frame member 16. Abutting circular plates 48, 50 allow relative rotating motion between body frame members 14, 16 about the longitudinal axis of the vehicle, defined herein as "rolling motion." Such rolling motion is confined to a single axis by circular members 48, 50.

Pin connection 42 between triangular portions 40, 44 of articulating joint 18 allow frame members 14, 16 to mutually pivot about the vertical axis of the vehicle, defined as "yawing motion" herein. This yawing motion is controlled by means of two hydraulic cylinders 52, 54, one on each side of articulating joint 18. Cylinder 52 has fore and aft ports 56, 58 respectively. Similarly, hydraulic cylinder 54 has fore and aft ports 60, 62 respectively. Both pistons 52, 54 are of the dual action type wherein the application of hydraulic fluid is the forward portion of the cylinder through ports 56 or 60 causes the piston to retract, and application of hydraulic fluid to the rear portion of a piston through aft ports 58 or 62 causes the pistons to expand.

Hydraulic line 64 interconnects the forward port 56 of piston 52 with the aft port 62 of piston 54. Similarly, hydraulic line 66 connects the aft port 58 of cylinder 52 with the forward port 60 of cylinder 54. In order to turn the snow cat of the present invention to the left, hydraulic fluid is applied to line 66 through line 68 from a source (not shown) so that pressure is applied to the aft portion of cylinder 52 and the forward portion of cylinder 54. Cylinder 52 will thus expand and cylinder 54 will contract so that the vehicle will pivot about pin 42 to disalign the track assemblies and cause the vehicle to turn. Conversely, application of hydraulic fluid through line 70 to line 64 causes the vehicle to turn to the right. The application of hydraulic pressure in line 68 and 70 is manually operable from the cab of the vehicle so that the snow cat is steered manually by manipulating the articulating joint. This eliminates the need for slowing or stopping certain of the track assemblies in order to turn the vehicle, which is difficult to impossible with the relatively wide track assemblies illustrated in the present invention.

When the articulating joint 18 illustrated in FIG. 2 is utilized to turn the snow cat 10 shown in FIG. 1, the use of a normal leaf spring suspension system allows the vehicle to bend into a bow. Namely, a left turn will cause the left front track assembly 20 and the right rear track assembly 26 to rise relative to the right front track assembly 22 and the left rear track assembly 24. A similar but opposite bowing effect occurs during a right turn. This bowing is minimized in the snow cat of the present invention by means of stabilizing assembly 34 shown in FIG. 3.

The operation of stabilizer assembly 34 is illustrated by viewing FIGS. 3 and 4 in combination. Stabilizer apparatus 34 is shown attached to aft body frame member 16, but a similar and opposite stabilizer assembly is attached to fore body frame member 14. Stabilizer apparatus 34 includes a pair of legs 80 depending from the opposite sides of aft body frame member 16. Each leg 80 has a relatively large aperture 82 at the lower end thereof. A torsion bar 84 is adapted to fit between legs 80 and has oppositely directed male spline ends 86 which project into apertures 82 in the legs. Armatures 88 having female spline portions 90 have an outer diameter adapted to mate with apertures 82 and legs 80. The female spline portion 90 of armatures 88 is adapted to mesh with splined ends 86 of torsion bar 84 so that armature 88 is rigidly interconnected with the torsion bar. The outer circumference of spline portions 90 of armatures 88 act as a bearing surface in abutment with aperture 82 in legs 80.

The ends of armatures 88 opposite from spline portions 90 have depending plates 92 rigidly attached thereto. Plates 92 mount to axle 30 illustrated in phantom in FIG. 3. Vertical movement of axle 30 is limited by leaf springs 32. Furthermore, relative vertical movement between the two sides of axle 30 emanating from differential 94 is severely restricted by the torsion bar 84 through armatures 88 to each side of the axle. However, torsion bar 84 does not interfere with vertical motion of both sides of axle 30 in concert, merely preventing relative vertical motion to eliminate the bowing effect mentioned previously.

The track assembly of the present invention is illustrated in more detail by way of reference to FIGS. 5 and 6 in combination. Each of the track assemblies 20-26 illustrated in FIG. 1 is substantially the same (although they need not be), and each has a substantially horizontal rectangular frame 100. A plurality of rows of rollers 102 are rotatably attached to frame 100. Rollers 102 can be pneumatic tires circumscribing a solid inner wheel, casters having a deformable outer layer or the like. In FIG. 5, an arrangement of four parallel rows of tandemly mounted rollers 102 is illustrated. However, it is to be expressly understood that the number of rows of rollers can be any number greater than two, although even numbers are preferred for symmetry.

Drive axle 30 emanating from the drive differential (not shown) passes through a raised portion 104 of frame 100 and connects to drive sprocket 106. In the embodiment illustrated herein, drive sprocket 106 comprises two laterally spaced parallel toothed gear segments 108, 110 each driven by drive axle 30. Drive sprocket 106 is mounted intermediate the various rows of wheels 102, and the upper surface of the drive sprocket is raised relatively to the wheels so that the endless track will be maintained in triangular configuration, as illustrated hereinbelow.

The endless track of the present invention is illustrated in more detail by way of reference to FIG. 6. Endless track 28 includes a plurality of laterally spaced endless bands 112. Bands 112 are constructed of rubber or other deformable material so that the track assembly 28 can wrap around rollers 102 and drive sprocket gears 108, 110 of the track assembly. A plurality of elongate grousers 114 are attached transversely to endless bands 112 to complete the endless track 28. Rollers 102 are in abutment with grousers 114 along the moving flat bottom portion of track 28. Each row of rollers fits in the spaces between adjacent endless bands 112 as illustrated and can be confined thereto by guides 116. Furthermore, the toothed gears 108, 110 of drive sprocket 106 engages the grousers 114 in adjacent spaces between the spaced bands 112. In this manner, both rollers 102 and drive sprocket 106 directly engages the grousers 114. In order to insure that rollers 102 and tooth wheels 108, 110 remain intermediate adjacent endless bands 112, a plurality of guides 116 are preferably mounted on the interior surface of each of the bands.

Grousers 114 of the present invention are longer than grousers normally found in the art due to the relatively large width of the endless track 28. The cross section of the grousers is substantially reduced relative to those found in the prior art for the purposes stated above. In order to achieve a high strength to weight ratio with the small elongate grouser, the grouser of the present invention is preferably formed as illustrated in FIG. 7. First, an elongate metal plate is formed into a triangular cross-sectioned shape 120. Member 120 has a flat base portion 122 and two inwardly inclined leg portions 124, 126 extending from the lateral edges of the base portion. The free ends of leg portions 124, 126 substantially meet at the apex of triangular member 120. A plurality of apertures 128 are drilled along the center line of base portion 122. A plurality of bolts 130 are inserted through the apertures 128 with the head portion interior to triangular member 120 and the threaded portion projecting through the apertures. An elongate center plate 132 is then inserted in triangular member 120. One lateral edge 134 of center plate 132 is in abutment with the head portions of bolts 130, and lateral edge 134 is welded to the base portion 122 of member 120 so that bolts 130 are fixed in position. Lateral edge 136 of center plate 132, which is opposite lateral edge 134, is adjacent the free ends of legs 124, 126 and the members are welded together at 138 to complete the grouser.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What I claim as new is:

1. A snow cat comprising:
   fore and aft substantially rigid body frame members;
   an articulating joint joining the fore and aft body frame members, said articulating joint permitting relative rolling motion and relative yawing motion between said fore and aft body frame members;
   four endless track assemblies, two of said track assemblies located on each side of the fore body frame member and the other two of said track assemblies located on each side of the aft body frame member, each said track assembly including a relatively wide endless track having a moving flat base portion adapted to ride over snow and means for maintaining said base portion in its substantially flat configuration;
   a first axle interconnecting the two track assemblies located on each side of the fore body frame member and a second axle interconnecting the two track assemblies on each side of the aft body frame member; fore spring means mounting the first axle to the fore body frame member and the second axle to the aft body frame member; and forward and aft stabilizer means, said forward stabilizer means comprising a first torsion bar interconnecting the track assemblies on each side of the fore body frame member to restrict relative vertical motion therebetween, said aft stabilizer means comprising a second torsion bar interconnecting the track assemblies on each side of the aft body frame member to restrict relative vertical motion therebetween.

2. A snow cat as recited in claim 1 and additionally comprising manually operable means for controlling the yawing motion between the fore and aft body frame members at the articulating joint, said controlling means being manually operable to manually steer the vehicle by changing the direction of the forward and aft track assemblies caused by controlling the yawing motion at the articulating joint.

3. A snow cat as recited in claim 1 wherein the first axle comprises a solid axle interconnecting the two track assemblies on each side of the fore body frame member, and wherein the second axle comprises a solid axle interconnecting the two track assemblies on each side of the aft body frame member.

4. A snow cat as recited in claim 1 wherein the means for maintaining the base portion of each said endless track in its substantially flat configuration comprises at least two parallel rows of rollers in rolling abutment with the base portion of said track, said rows of rollers partially spanning the relatively wide track so that the base portion thereof is maintained in its substantially flat configuration even over irregular terrain.

5. A snow cat comprising:

fore and aft substantially rigid body frame members;

an articulating joint joining the fore and aft body frame members and permitting relative rolling motion and relative yawing motion between said frame members;

four endless track assemblies, two of said track assemblies located on each side of the fore body frame member and the other two of said track assemblies located on each side of the aft body frame member, each said track assembly including at least two parallel rows of rollers and a drive sprocket intermediate the fore and aft rollers of each said row, said drive sprocket having an upper surface projecting above the upper surface of each of the rolles, and a relatively wide track adapted to circumscribe the rollers and the drive spricket to maintain said track in a generally triangular configuration having a flat lower portion adapted to ride on the snow and a raised central portion;

a first axle interconnecting the two track assemblies located on each side of the fore body frame member and a second axle interconnecting the two track assemblies on each side of the aft body frame member;

spring means mounting the first axle to the fore body frame member and the second axle to the aft body frame member; and forward and aft stabilizer means, said forward stabilizer means comprising a first torsion bar interconnecting the track assemblies on each side of the fore body framae member to restrict relative vertical motion therebetween, said aft stabilizer means comprising a second torsion bar interconnecting the track assemblies on each side of the aft body frame member to restrict relative vertical motion therebetween.

6. A snow cat as recited in claim 5 wherein each said relatively wide track comprises a plurality of laterally spaced endless bands defining an outer circumference and a plurality of grousers transversely mounted to the outer circumference of the bands, said drive sprocket adapted to engage the grousers in the space between adjacent laterally spaced bands, each row of rollers adapted to abut the grousers in other spaces between adjacent laterally spaced bands.

7. A snow cat as recited in claim 6 and additionally comprising a plurality of guides mounted on the interior surfaces of the bands to maintain said rollers intermediate said bands.

8. A snow cat comprising:

fore and aft substantially rigid body frame members;

an articulating joint joining the fore and aft body frame members, said articulating joint permitting relative rolling motion and relative yawing motion between said fore and aft body frame members;

means for manually controlling the relative yawing motion between the fore and aft body frame members at the articulating joint to steer the vehicle by changing the relative direction of the fore and aft body frame members;

four endless track assemblies, two of said track assemblies located on each side of the fore body frame member and the other two of said track assemblies located on each side of the aft body frame member, each said track assembly including at least two parallel rows of rollers, a drive sprocket between two of the rows of rollers and intermediate the fore and aft rollers of each said row, said drive sprocket having an upper surface projecting above the upper surface of each of the rollers, and a relatively wide track adapted to circumscribe the rollers and the drive sprocket to maintain said track in a generally triangular configuration having a flat lower portion adapted to ride on the snow and a raised central portion, each said relatively wide track comprising a plurality of laterally spaced endless bands defining an outer circumference and a plurality of grousers transversely mounted to the outer circumference of the bands, said drive sprocket adapted to engage the grousers in the space between adjacent laterally spaced bands, each row of rollers adapted to abut the grousers in other spaces between adjacent laterally spaced bands;

a first axle interconnecting the two track assemblies located on each side of the fore body frame member and a second axle interconnecting the two track assemblies on each side of the aft body frame member;

spring means mounting the first axle to the fore body frame member and the second axle to the aft body frame member; and forward and aft stabilizer means, said forward stabilizer means comprising a first torsion bar interconnecting the track assemblies on each side of the fore body frame member to restrict relative vertical motion therebetween, said aft stabilizer means comprising a second torsion bar interconnecting the track assemblies on each side of the aft body frame member to restrict relative vertical motion therebetween.

\* \* \* \* \*